Patented July 2, 1946

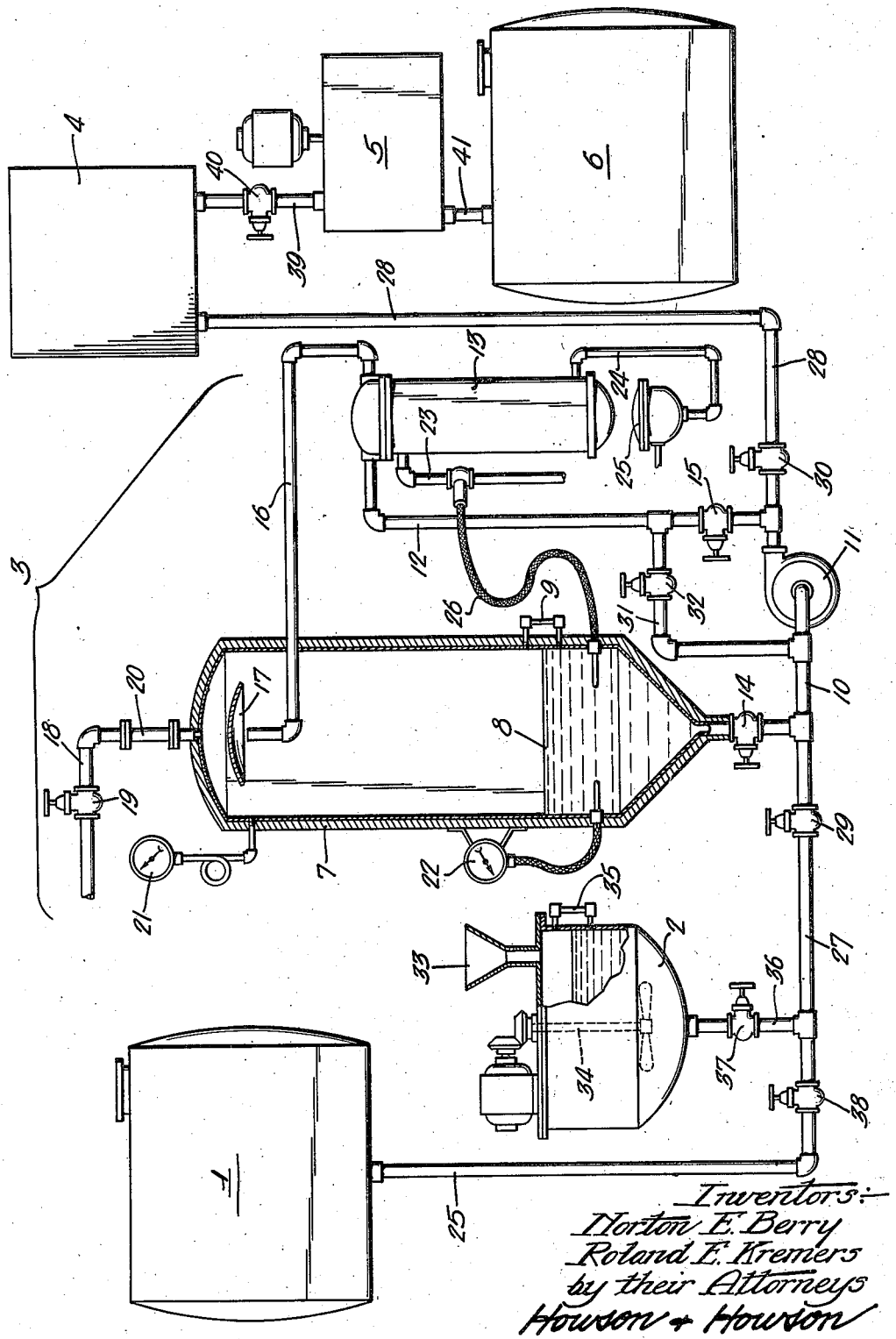

2,402,940

UNITED STATES PATENT OFFICE 2,402,940

PROCESS OF TREATING CASHEW NUT SHELL LIQUID

Norton E. Berry, Newburg, Ind., and Roland E. Kremers, Summit, N. J., assignors to General Foods Corporation, Hoboken, N. J., a corporation of Delaware Application September 15, 1943, Serial No. 502,530

12 Claims. (Cl. 260—624)

1

The present invention relates to a process for the treatment of anacardic acid-containing liquids, and more particularly it relates to a process for the decarboxylation of such liquids to convert the anacardic acid content thereof into anacardol.

The principal object of this invention is to provide an efficient and economical process of decarboxylating the anacardic acid content of cashew nut shell liquid, or any of its fractions, so that said acid is substantially completely converted into anacardol without undesirable side reactions and without encountering difficulties due to the formation of a foam during said decarboxylation.

Another object of this invention is to provide a method of decarboxylating anacardic acid-containing liquids in which said decarboxylation may be accomplished at lower temperatures and in less time than has heretofore been required for decarboxylation procedures, and under conditions resulting in the formation of a materially reduced volume of foam and in the breaking down of the foam produced.

A further object of this invention is to enable the anacardic acid contained in cashew nut shell liquid, or in any of its fractions, to be safely decarboxylated in apparatus of reduced size.

Other objects will be apparent from a consideration of this specification and the claims.

The accompanying drawing illustrates diagrammatically the novel form of apparatus found particularly suitable in practicing the process of the invention.

The heating of anacardic acid to a relatively high temperature causes a removal of carbon dioxide from the carboxyl group of the acid with the resulting formation of the phenol, anacardol. This phenol is probably present in some proportion in cashew nut shell liquid as its exists in cashew shells, but owes its presence in liquids commercially obtained from cashew shells largely to its formation from anacardic acid. The methods of extraction of cashew nut shell liquid depending on heat to destroy the cellular structure of the shells yield liquids having the greater proportion of the anacardic acid originally contained in the shells converted into anacardol. On the other hand, the liquids obtained by pressure or cold pressing or solvent-extraction of the cashew shells contain large amounts of anacardic acid in proportion to anacardol. While the anacardic acid content of heat-extracted cashew nut shell liquids is not generally greater than 16%, the liquids obtained by treatment of cashew shells at a relatively low temperature are known to contain up to 70%, or more, of anacardic acid. The present invention is applicable to the decarboxylation of the anacardic acid contained in any of these liquids, as well as in any of their fractions susceptible to foaming under decarboxylating conditions, including crude anacardic acid, for example 90% pure, and these materials are included herein in the term "an anacardic acid-containing liquid susceptible to foaming upon heating." The process of the present invention is particularly applicable for the treatment of such liquids relatively high in anacardic acid content.

It is known that relatively pure anacardic acid can be completely decarboxylated by heating it at a sufficiently high temperature, say, about 200° C. in an open vessel. However, if the material to be decarboxylated is cashew nut shell liquid, or crude fractions of anacardic acid, the reaction is accompanied by the formation of an exceedingly stable foam, which is apparently due to the effect of natural frothers in cashew nut shell liquid on the carbon dioxide gas evolved by decarboxylation. The foam is of such stability that the most efficient means of breaking foam, namely by impact with propeller blades or the like, is without significant effect. Consequently, a very large volume of foam is formed even at the start of the reaction and persists almost to the last stages of the decarboxylation reaction. In the case of crude fractions of anacardic acid or of cashew nut shell liquid of high anacardic acid content, the volume of foam may be more than ten times the volume of the original charge, if temperatures most favorable for the reaction are employed. Decarboxylation under these conditions requires the use of reaction vessels which are huge in proportion to the original charge. In view of the very large volume of foam, it has been impossible to obtain its thorough admixture with the mass of liquid by agitation, and this is accentuated by the fact that any attempt to agitate the liquid mass results in increasing the volume of foam. Since it is impossible to break up the foam, the anacardic acid held in the foam is ineffectively heated, which greatly prolongs the period of treatment for complete decarboxylation. There is also the danger of the foam overflowing from the reaction vessel, and in view of the highly toxic and vesicant nature of cashew nut shell liquid, adequate safeguards against this danger must be provided, not only in the design of the vessels employed for the reaction, but also in the choice of the factors influencing the reaction. It has hitherto been possible to avoid these foaming difficulties only by prior isolation and purification of anacardic acid.

In accordance with the present invention, it has been found that the above-mentioned difficulties may be obviated if the anacardic acid-containing liquid is subjected to heat in a closed apparatus of such restricted size that there is sufficient build-up of pressure in the reaction apparatus due to the carbon dioxide gas liberated from the anacardic acid to reduce materially the volume of foam produced by the reaction. While the invention will be described in connection with the preferred process where substantially all of the anacardic acid of the liquid is decarboxylated and consequently where at least a major part of the decarboxylation of the anacardic acid-containing liquid is carried out under pressure, it is to be understood that if desired, the process may be employed to produce a liquid having a reduced content of anacardic acid, rather than a fully decarboxylated product, and in this case, the process herein described may be stopped at the desired point. After substantial completion of the decarboxylation, no difficulty is encountered when the pressure is released, in spite of the fact that the foam in the apparatus tends to expand upon release of the pressure and the fact that carbon dioxide dissolved in the liquid evolves upon the release of pressure and tends to produce more foam.

As is well known, a reaction of the type of that involved in the present process is reversible under pressure. There is, therefore, a maximum equilibrium pressure above which the reaction will not proceed. In other words, the rate of reaction in one direction becomes equal to the rate of reaction in the other direction and it becomes impossible to complete the reaction under pressure. In the case of the decarboxylation reaction involved in the process of the present invention, if this equilibrium were to be obtained in the reaction vessel, the process would be of little or no commercial significance since it would then be necessary to complete the reaction under atmospheric conditions with the accompanying formation of large volumes of foam. Furthermore, in reactions of this type, the rate of reaction decreases with increase of pressure. Hence, even in the absence of a chemical equilibrium pressure in the reaction vessel, if the pressure were to decrease the rate of reaction appreciably, the rate of reaction might not be sufficiently rapid for a practical process. It has been ascertained, however, that in spite of the restricted size of the vessel necessary to minimize the volume of the foam, the pressure at which chemical equilibrium occurs is far greater than any pressure which builds up in the closed vessel and that rate of reaction is not affected appreciably by the pressure created. It is, therefore, possible to decarboxylate the anacardic acid held in both the liquid and the foam by the economical and expeditious process described herein.

In the process of the present invention, not all of the carbon dioxide gas is evolved from the liquid, but some of the carbon dioxide gas is dissolved therein, and the amount dissolved increases with increase of pressure in the reaction apparatus. It has nevertheless been found that, in spite of the reversibility of the reaction in the liquid, decarboxylation may be carried to substantial completion. The volume of foam produced by the reaction, as has been stated, is minimized by the fact that it is under compression in the reaction apparatus, and the size of the apparatus governs the volume of the foam, although the amount of foam is decreased by the fact that some of the carbon dioxide gas liberated by the reaction is dissolved in the liquid.

The preferred embodiment of the present invention, therefore, comprises decarboxylating the anacardic acid content of an anacardic acid-containing liquid susceptible to foaming upon heating, within a confined space having a volume substantially greater than that of the liquid, by heating the liquid to provide a temperature to decarboxylate the anacardic acid of the liquid with the liberation of carbon dioxide therefrom until decarboxylation is substantially complete, and during at least the major portion of said heating step, subjecting said liquid to pressure created in said confined space by carbon dioxide liberated from said anacardic acid to reduce materially the volume of foam produced. Upon completion of at least a major portion of the decarboxylation process, the pressure is released. The pressure may be permitted to build up throughout the heating step until pressure equilibrium (maximum pressure at the temperature employed) is attained in the confined space; or, the pressure may be reduced at least once during the heating step, in which case care is taken not to remove the foam from the space.

A catalyst may be admixed with the anacardic acid-containing cashew nut shell liquid, in which event, the temperature required for decarboxylation may be reduced. Advantageously, the liquid during the heating step is agitated, and if a catalyst is employed the agitation maintains the catalyst uniformly distributed in the liquid. In the now preferred embodiment of the invention, the heat is furnished to the liquid by circulating the liquid through a closed path in heat-exchange relationship with a heating medium. Advantageously, the heat-exchanger is external of the confined space, but it is to be understood that the heat exchanger may be placed inside the confined space. The heated liquid is advantageously returned to the upper part of the confined space, and allowed to gravitate through the foam produced therein in order to provide contact between the foam and the heated liquid, and to agitate the liquid.

In spite of the agitation, there is a breaking down of the foam as the reaction proceeds in the closed vessel and the rate at which the foam breaks down eventually becomes greater than the rate at which new foam can be produced. The sinking of the foam which occurs as the reaction approaches completion may be due to various factors, one of which appears to be the effect of heat on the frothing elements stabilizing the foam. Thus, the foam will have largely subsided at the end of the reaction and this may be attributed to the inactivation of the frothing elements. At the end of the reaction, there can be no further evolution of gas from the anacardic acid, and since the frothing elements appear to be largely inactivated, there can be no appreciable formation of foam upon release of dissolved carbon dioxide from the liquid. It is, therefore, possible, as stated, to allow the pressure to build up continuously until the reaction is complete or substantially complete and then to release it to atmospheric pressure without loss of foam. Alternatively, since free gas accumulates above the foam throughout the reaction, the pressure as has also been stated may be released partially from time to time during the reaction, and during the initial stages of the reaction, the pressure, if desired, may be completely released. In carrying out the process, whenever the pressure is released or reduced, it will be released or reduced gradually to prevent entrainment of the liquid or foam in the escaping gas.

As above pointed out, in the preferred process at least a major part of the decarboxylation reaction will be conducted under pressure, that is to say, the decarboxylation will be carried to the point under pressure where heating at atmospheric pressure will not present difficulties due to foam formation. Irrespective of whether the pressure is allowed to build up continuously or whether it is intermittently released, the process is advantageously carried to substantial completion under pressure. In such event, any anacardic acid remaining in the liquid may be partially or fully decarboxylated during the release of pressure, depending on the amount of anacardic acid remaining in the solution and the time employed in releasing the pressure. If the amount of acid is appreciable or the pressure is released rapidly, for example within twenty minutes, it may be necessary to continue the heating and agitation under atmospheric conditions to obtain a completely decarboxylated product. Usually, the gas in solution in the liquid will only be partly removed during the release of pressure and accordingly it will usually be necessary to continue heating for some time under atmospheric conditions to free the liquid of the dissolved gas. A completely decarboxylated product having substantially no carbon dioxide gas in solution is indicated by a complete absence of foam upon discontinuing the agitation.

In the embodiment where the pressure is allowed to increase continually until pressure equilibrium is reached in the reaction apparatus, the foam may or may not have largely subsided, but in any case a considerable quantity of carbon dioxide gas will have collected above the foam, and the pressure is then gradually or intermittently released. When pressure equilibrium has been attained and the pressure has been released, the decarboxylation of the anacardic acid will be substantially complete and heating and agitation may be continued under atmospheric conditions to free the liquid of dissolved gas.

As previously stated, instead of allowing pressure to build up continuously to equilibrium in the reaction apparatus, the pressure of carbon dioxide gas may be reduced, that is released at least partially, at any time during the decarboxylation reaction. This procedure has the advantage of reducing the maximum pressure which is attained in the reaction apparatus. This maximum pressure may be attained at any time during the reaction, for example, shortly after the reaction has started or even at the end of the reaction. The point at which maximum pressure will occur depends upon the number of times pressure is released, the extent of each pressure release, and the time intervals between pressure releases. The pressure may obviously be released as often as may be desired during the decarboxylation reaction and the extent to which it may be reduced at any particular time is governed by the quantity of gas which has collected above the foam. Moreover, as has been pointed out, it will generally be found possible to fully release the pressure developed in the initial stages of the reaction without loss of foam. After each pressure release prior to the completion of the process, the pressure is allowed to build up from the point to which it has been released. The liquid, after the final release of the pressure, may be further heated if desired.

In practicing the present invention, although any form of closed apparatus may be used in which the charge is heated, it is preferred, as hereinbefore mentioned, to employ equipment in which the heated liquid is brought in contact with the foam. It is, therefore, advantageous to employ a pressure vessel from which liquid is continuously circulated through a heat exchanger and to which liquid is returned from the heat exchanger above the liquid level. The apparatus also includes means for introducing the heated liquid into the upper portion of the pressure vessel in the form of a spray for gravitation into the liquid in the bottom of the vessel. This means advantageously comprises a vertical discharging nozzle for introducing the heated liquid into the upper part of the vessel against an impingement surface spaced above the nozzle. The agitation created by this circulation of liquid is effective in the decarboxylation of the anacardic acid, because of two factors, namely, a continuous flow of liquid through the foam and a continuous introduction of foam into the liquid, each of these factors being effective to increase the surface of contact between liquid and foam, and thus to reduce the anacardic acid content of the foam. Further advantages of this form of apparatus reside in the uniform and efficient transfer of heat to the liquid mass as a result of its circulation through the heat exchanger, and, since localized overheating of the oil is effectively prevented, undesirable side reactions which would otherwise tend to occur are minimized. In addition, the circulation results in the uniform distribution of the catalyst (when employed) in the liquid.

The size of apparatus which may be used in practicing the present invention is governed solely by practical considerations as to the maximum pressure which is to be attained during the decarboxylation reaction. Though it is not desired to limit the invention to any particular size of apparatus, it has been found desirable to employ reaction apparatus having three to six times the volume of the charge. The only limitation upon the size of apparatus which may be used in practicing the invention is that the foam should be confined to a volume substantially less than its normal volume under atmospheric conditions.

The present invention may be practiced in the presence of substances having a catalytic action on the decarboxylation reaction, as disclosed in a copending application of one of us, Serial No. 585,197, filed on March 25, 1945, for Process of decarboxylating ortho- and para-hydroxy benzoic acids, and it has been ascertained that the pressure has no appreciable effect on the catalyst so that reduced temperatures substantially the same as those employed in the catalytic decarboxylation at atmospheric pressure as described in the said application may be used in carrying out the process of the present invention in the presence of a catalyst. Preferred catalytic substances include the alkali and alkaline earth metal (including magnesium), anacardates which may be added as anacardate or formed in situ by the addition of alkali or alkaline earth metal compounds, such as the oxides and hydroxides, which react with the anacardic acid to form an anacardate. Generally, the amount of such material, if employed, is between about .5% to 5% by weight based on the weight of the acid treated, an amount between about 1% and 2% being usually employed. The amount may exceed 5%, if desired, although amounts in excess of 2% are not recommended since they do not increase the efficiency of the treatment and represent a loss of material. Generally stated, the use of a catalyst in the process of the present invention materially reduces the temperatures required for the decarboxylation reaction, as well as restricts the reaction substantially entirely to decarboxylation. It should be understood, however, that the present invention may be practiced either with or without the use of catalysts. When a catalyst is used in the process of the present invention, however, agitation of the liquid, by circulation or other means, becomes important in order to facilitate uniform distribution of the catalyst throughout the reaction mass.

In practicing the present invention, temperatures ranging from about 180° C. to about 200° C. will generally be employed in the absence of catalysts, while temperatures ranging from about 125° C. or lower to about 150° C. or higher will generally be employed in the presence of catalysts. These ranges of temperatures, however, are merely indicated as being generally the most favorable for accomplishing the decarboxylation reaction with and without catalysts. In general, it may be stated that the present invention should be practiced at temperatures sufficiently high to cause the reaction to proceed, and as indicated above, the temperatures required for effecting decarboxylation without catalysts are necessarily higher than the temperatures required for decarboxylation when a catalyst is utilized.

The present invention makes possible a reduction in the period of time of treatment required for complete decarboxylation. Although the rate of reaction in the liquid may be decreased by the pressure exerted by the carbon dioxide gas, the rate of reaction in the foam is apparently increased to a considerable degree by reason of its diminished volume, and, in the preferred embodiment, by the contact provided between the foam and the heated liquid. Consequently, the increased rate of reaction in the foam more than compensates for the decreased rate of reaction in the liquid.

The accompanying drawing diagrammatically illustrates a form of apparatus found particularly suitable in practicing the invention, it being understood that the form of apparatus illustrated, though preferred, is not to be construed as limiting the scope of the invention.

Referring to the drawing, the apparatus illustrated comprises a tank 1 for storage of untreated anacardic-acid-containing liquid, a mixer 2 for introducing (if desired) a catalyst into the liquid to be decarboxylated, a decarboxylation unit generally indicated by the numeral 3, a tank 4 for temporary storage of the decarboxylated liquid, a centrifuge 5 for clarification of the decarboxylated liquid, and a tank 6 for final storage of the decarboxylated liquid.

The decarboxylation unit 3 comprises an insulated pressure vessel 7 which is adapted to contain liquid up to a certain level 8 indicated by sight glass 9. The vessel 7 has a coned bottom connected by a pipe line 10 to a pump 11, the outlet of which is connected by a pipe line 12 to a heat exchanger 13. Valves 14 and 15 are respectively included in pipe lines 10 and 12. The outlet of the heat exchanger 13 is connected to a pipe line 16 leading into the upper part of the pressure vessel 7. As shown, the pipe line 16 may direct the inflow of liquid into the vessel 7 against a curved inverted concave impingement surface or deflector 17. A pipe line 18 provided with a valve 19 leads from the top of the vessel 7 for the discharge of the pressure created by the carbon dioxide in said vessel 7. Also included in pipe line 18 is a sight glass 20 for indicating any rise of foam from the vessel 7 upon release of carbon dioxide gas pressure therefrom. The vessel 7 may be provided with a pressure gauge 21 and with a temperature indicator 22.

The heat exchanger 13 may be of the well-known construction comprising multipass tubular heaters (not shown). Steam is admitted to the heat exchanger 13 by means of a pipe 23 and the steam condensate is removed by a pipe 24 connected to a steam trap 25. A temperature control 26 may be provided to operate in conjunction with the steam inlet 23.

With valves 14 and 15 open, the pump 11 continuously flows liquid from the vessel 7 through the heat exchanger 13 and returns it to the vessel 7 above the level 8. The volume of liquid treated determines the level 8 and may be approximately ⅙ to ⅓ of the total volume of the decarboxylator. By discharging against the plate or deflector 17, the liquid issuing from the pipe line 16 is spread into numerous descending streams through the foam.

The charge of liquid to be decarboxylated is introduced into the decarboxylator through a pipe line 27 and is carried after treatment through a pipe line 28 to temporary storage tank 4. Valves 29 and 30 are included in pipe lines 27 and 28, respectively. A pipe line 31 provided with a valve 32 by-passes the pump 11 for the purposes of discharging liquid contained in the heat exchanger 13 and its pipe connections. Pipe line 27 connects with the tank 1, while pipe line 28 connects with the tank 4.

The mixer 2 is used when it is desired to introduce a catalyst as above described into the decarboxylator in a state of admixture with the charge of anacardic acid-containing liquid or portion thereof. As shown, the mixer 2 comprises a tank provided with a hopper 33 for introducing the catalyst into the mixer, an agitator 34 for mixing the catalyst with the desired volume of liquid, and a sight glass 35 for indicating the level of the contained liquid. A pipe line 36 provided with a valve 37 connects the mixer 2 to the pipe line 27, which is itself provided with a valve 38. The purpose of the mixer 2 is merely to introduce the catalyst into the liquid which is then introduced into the decarboxylator. When the catalyst is mixed in mixer 2 with only a part of the charge, it eventually is dispersed throughout the entire charge by agitation in the decarboxylator provided by the circulation of the heated liquid.

The use of centrifuge 5 is optional and may be used to free the decarboxylated liquid from any slight amount of slime produced by the action of heat on the liquid or any solid residue present in the treated liquid. As shown, the centrifuge 5 connects with the tank 4 through a pipe line 39 provided with a valve 40. After being decarboxylated, the liquid is temporarily held in the tank 4 and is discharged at suitable intervals into the centrifuge 5. The clarified liquid is discharged from the centrifuge 5 through a pipe line 41 connecting with the tank 6. In the event no catalyst has been employed, the decarboxylated liquid may be pipe directly to tank 6.

In operation, when a catalyst is employed, assuming that all valves are closed, valves 37 and 38 are opened to allow the desired volume of anacardic acid-containing liquid to be introduced into the mixer 2 from storage tank 1. Valve 38 is then closed, the desired quantity of catalyst is introduced through hopper 33, and liquid and catalyst are thoroughly admixed by agitator 34. Valves 15, 19, and 29 are then opened and the mixture of liquid and catalyst is introduced into the decarboxylator by means of pump 11. If no catalyst is to be employed or if only part of the charge is to be introduced into the decarboxylator with the catalyst, the charge containing no catalyst is introduced into the decarboxylator by closing valve 37 and opening valve 38. After the charge has been introduced into the decarboxylator, valve 29 is closed, valve 14 opened, and valve 19 closed. The resulting circulation of liquid through the heat exchanger 13 heats it to a temperature determined by control 26. Upon return of the heated liquid through pipe 16 and its vertical discharging nozzle, the liquid impinges against the inverted concave deflector 17 and then falls in a spray through the foam into the liquid. Valve 19 may be opened at any time during the decarboxylation reaction to release carbon dioxide gas pressure, and the release of foam is prevented by shutting valve 19 when foam appears in sight glass 20. With valve 19 in full open position at the end of the reaction, the decarboxylated charge is discharged, by opening valves 30 and 32 and closing valve 15, through pipe line 28 to tank 4 when the treated liquid is to be centrifuged, or directly to tank 6. Valve 30 is subsequently closed and the other valves operated as described for the decarboxylation of a new charge. While decarboxylation of a new charge proceeds in the decarboxylator, the liquid containing the solid residue formed by the catalyst transferred to tank 4 from the preceding run is passed by means of valve 40 in suitable batches through the centrifuge 5 and pipe line 41 into storage tank 6.

The following specific examples will serve to illustrate and explain the present invention and were carried out in a decarboxylator of the character described having a total volume of about twelve gallons.

*Example 1*

Twenty-five pounds (3 gallons) of cashew nut shell liquid containing approximately 65% anacardic acid were introduced into the decarboxylator in admixture with 0.44 pound of lime. Steam at 60 pounds gauge pressure (153° C.) was admitted to the heat exchanger 13, through which circulation was started. Valve 19 was left open until foam appeared in sight glass 20. The gas pressure was subsequently allowed to build up continuously to a maximum equilibrium pressure of 130 pounds per square inch and was then slowly released to zero at which time the decarboxylation was substantially complete. Treatment was thereafter contained under atmospheric conditions to evolve the dissolved carbon dioxide from the liquid. The total heating period was four hours.

The details of the run are shown in the following table:

| Time, mins. | Gas pressure, lbs./sq. in. | Temperature of liquid, °C. | Remarks |
|---|---|---|---|
| 0 | 0 | 29 | |
| 10 | 0 | 106 | |
| 18 | 0 | 121 | Gas outlet valve closed. |
| 20 | 10 | 126 | |
| 30 | 61 | 134 | |
| 40 | 86 | 139 | |
| 50 | 99 | 141 | |
| 60 | 105 | 142 | |
| 150 | 130 | 146 | |
| 180 | 130 | 146 | Started releasing pressure. |
| 186 | 24 | 144 | |
| 193 | 0 | 145 | Finished releasing pressure. |
| 240 | 0 | 147 | Foaming absent. |

*Example 2*

Twenty pounds (2.4 gallons) of crude anacardic acid (90% pure) were introduced into the decarboxylator in admixture with 0.2 pound of lime. Valve 19 was closed and steam at 40 to 50 pounds gauge pressure (142° C. to 148° C.) admitted to the heat exchanger 13, through which circulation was started. The gas pressure in the decarboxylator built up in approximately 15 minutes to 40 pounds per square inch, when it was fully released without loss of foam. Valve 19 was then closed and heating continued for about one hour at a steam gauge pressure of 40 to 50 pounds. The steam pressure was then increased to 80–90 pounds (163° C.–166° C.) and the gas pressure permitted to reach 80 pounds per square inch. The presence of considerable foam at this point prohibited complete discharge of gas pressure. Valve 19 was, therefore, operated to drop the gas pressure to only 65 pounds per square inch and the gas pressure was thereafter allowed to build up to approximately 75 pounds per square inch. This procedure was repeated several times effecting pressure release in each instance from a slightly lower initial pressure to a much lower final pressure. After about one and a half hours heating at a steam pressure of 80–90 pounds per square inch, the gas pressure was gradually dropped to zero. No further gas pressure could be developed, indicating that decarboxylation was complete. The total heating period was about three hours.

It is understood that the invention is in no way limited to the particular procedure described in the foregoing examples. For example, without the use of lime or other catalyst, it is possible to attain complete decarboxylation in substantially the same periods of time, if a sufficient temperature is employed for the reaction. It will be further understood that the invention is in no way limited to the use of apparatus circulating the charge of anacardic acid-containing liquid through a heat exchanger. Though this form of apparatus is preferred, the invention may be practiced in any suitable closed apparatus employing conventional means for heating, and preferably for agitating, the charge.

The foregoing specification and description include the essential and distinctive thought of our invention, but it is to be distinctly understood that the same may be modified in various ways and/or combined with various other details without affecting the peculiar results obtained, without departing from the spirit of the invention or the scope of the appended claims.

We claim:

1. The steps in the process of decarboxylating the anacardic acid content of an anacardic acid-containing liquid susceptible to foaming upon heating, within a confined space having a volume substantially greater than that of the liquid, which comprise heating said liquid to provide a temperature to decarboxylate anacardic acid contained in said liquid with the liberation of carbon dioxide therefrom; and subjecting said heated liquid to pressure created in said confined space by carbon dioxide liberated from said anacardic acid to reduce materially the volume of foam produced.

2. The process of claim 1 wherein a decarboxylating catalyst selected from the group consisting of alkali and alkaline earth metal anacardates is present in the liquid treated.

3. The steps in the process of decarboxylating the anacardic acid content of an anacardic acid-containing liquid susceptible to foaming upon heating, within a confined space having a volume substantially greater than that of the liquid, which comprise heating said liquid to provide a temperature to decarboxylate anacardic acid contained in said liquid with the liberation of carbon dioxide therefrom until decarboxylation is substantially complete; and during at least the major portion of said heat-treatment subjecting said liquid to pressure created in said confined space by carbon dioxide liberated from said anacardic acid to reduce materially the volume of foam produced.

4. The steps in the process of decarboxylating the anacardic acid content of an anacardic acid-containing liquid susceptible to foaming upon heating, within a confined space having a volume substantially greater than that of the liquid, which comprise heating said liquid by circulating said liquid through a closed path in heat-exchange relationship with a heating medium to provide a temperature to decarboxylate the anacardic acid of said liquid in said confined space with the liberation of carbon dioxide therefrom; returning said heated liquid to the upper part of said confined space; gravitating said heated liquid in said confined space through the foam produced therein; and subjecting said heated liquid to pressure created in said confined space by carbon dioxide liberated by said anacardic acid to reduce materially the volume of foam produced.

5. The process of claim 4 wherein a decarboxylating catalyst selected from the group consisting of the alkali and alkaline earth metal anacardates is present in the liquid treated.

6. The steps in the process of decarboxylating the anacardic acid content of an anacardic acid-containing liquid susceptible to foaming upon heating, within a confined space having a volume substantially greater than that of the liquid, which comprise heating said liquid to provide a temperature to decarboxylate anacardic acid contained in said liquid with the liberation of carbon dioxide therefrom; subjecting said heated liquid to the pressure created in said confined space by the carbon dioxide liberated from said anacardic acid until pressure equilibrium is attained in said confined space to reduce materially the volume of foam produced; and subsequently releasing the pressure.

7. The steps in the process of decarboxylating the anacardic acid content of an anacardic acid-containing liquid susceptible to foaming upon heating, within a confined space having a volume substantially greater than that of the liquid, which comprise heating said liquid by circulating said liquid through a closed path externally of said confined space and in heat-exchange relationship with a heating medium to provide a temperature to decarboxylate the anacardic acid of said liquid in said confined space with the liberation of carbon dioxide therefrom; returning said heated liquid to the upper part of said confined space; gravitating said heated liquid in said confined space through the foam produced therein; subjecting said heated liquid to pressure created in said confined space by the carbon dioxide liberated from said anacardic acid until pressure equilibrium is obtained in said confined space to reduce materially the volume of foam produced; and subsequently releasing the pressure.

8. The steps in the process of decarboxylating the anacardic acid content of an anacardic acid-containing liquid susceptible to foaming upon heating, within a confined space having a volume substantially greater than that of the liquid, which comprise providing at least a portion of said liquid to be treated with a decarboxylating catalyst selected from the group consisting of the alkali and alkaline earth metal anacardates, heating said liquid by circulating said liquid through a closed path externally of said confined space and in heat-exchange relationship with a heating medium to provide a temperature to decarboxylate the anacardic acid of said liquid in said confined space with the liberation of carbon dioxide therefrom; returning said heated liquid to the upper part of said confined space; gravitating said heated liquid in said confined space through the foam produced therein; subjecting said heated liquid to the pressure created in said confined space by the carbon dioxide liberated from said anacardic acid until pressure equilibrium is obtained in said confined space to produce materially the volume of foam produced; and subsequently releasing the pressure.

9. The steps in the process of decarboxylating the anacardic acid content of an anacardic acid-containing liquid susceptible to foaming upon heating, within a confined space having a volume substantially greater than that of the liquid, which comprise heating said liquid to provide a temperature to decarboxylate the anacardic acid contained in said liquid with the liberation of carbon dioxide therefrom; subjecting said heated liquid to the pressure created in said confined space by carbon dioxide liberated from said anacardic acid to reduce materially the volume of foam produced; and reducing said pressure at least once without removing foam from said confined space.

10. The steps in the process of decarboxylating the anacardic acid content of an anacardic acid-containing liquid susceptible to foaming upon heating, within a confined space having a volume substantially greater than that of the liquid, which comprise heating said liquid to provide a temperature to decarboxylate anacardic acid contained in said liquid with the liberation of carbon dioxide therefrom; subjecting said heated liquid to the pressure created in said confined space by carbon dioxide liberated from said anacardic acid to reduce materially the volume of foam produced; and intermittently reducing said pressure without removing foam from said confined space.

11. The steps in the process of decarboxylating the anacardic acid content of an anacardic acid-containing liquid susceptible to foaming upon heating, within a confined space having a volume substantially greater than that of the liquid, which comprise heating said liquid by circulating said liquid through a closed path externally of said confined space and in heat-exchange relationship with a heating medium to provide a temperature to decarboxylate the anacardic acid of said liquid in said confined space with the liberation of carbon dioxide therefrom returning said heated liquid to the upper part of said confined space; gravitating said heated liquid in said confined space through the foam produced therein; subjecting said heated liquid to the pressure created in said confined space by carbon dioxide liberated from said anacardic acid to reduce materially the volume of foam produced; and intermittently reducing said pressure without removing foam from said confined space.

12. The steps in the process of decarboxylating the anacardic acid content of an anacardic acid-containing liquid susceptible to foaming upon heating, within a confined space having a volume substantially greater than that of the liquid, which comprise providing at least a portion of said liquid to be treated with a decarboxylating catalyst selected from the group consisting of the alkali and alkaline earth metal anacardates, heating said liquid by circulating said liquid through a closed path externally of said confined space and in heat-exchange relationship with a heating medium to provide a temperature to decarboxylate the anacardic acid of said liquid in said confined space with the liberation of carbon dioxide therefrom; returning said heated liquid to the upper part of said confined space; gravitating said heated liquid in said confined space through the foam produced therein; subjecting said heated liquid to the pressure created in said confined space by carbon dioxide liberated from said anacardic acid to reduce materially the volume of foam produced; and intermittently reducing said pressure without removing foam from said confined space.

NORTON E. BERRY.
ROLAND E. KREMERS.